US008493623B2

(12) United States Patent
Kuo et al.

(10) Patent No.: US 8,493,623 B2
(45) Date of Patent: Jul. 23, 2013

(54) ADAPTIVE EXPOSURE PRINTING AND PRINTING SYSTEM

(75) Inventors: Chung-Hui Kuo, Fairport, NY (US); Hwai-Tzuu Tai, Rochester, NY (US); Stacy M. Munechika, Fairport, NY (US); Cumar Sreekumar, Penfield, NY (US); Eric K. Zeise, Pittsford, NY (US); Stephen J. Farnand, Fairport, NY (US); Thomas A. Henderson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 954 days.

(21) Appl. No.: 12/577,233

(22) Filed: Oct. 12, 2009

(65) Prior Publication Data

US 2010/0097657 A1    Apr. 22, 2010

Related U.S. Application Data

(60) Provisional application No. 61/106,172, filed on Oct. 17, 2008, provisional application No. 61/183,992, filed on Jun. 4, 2009.

(51) Int. Cl.
*H04N 1/40* (2006.01)

(52) U.S. Cl.
USPC ............ 358/3.01; 358/1.9; 358/518; 358/1.1; 347/249; 726/20

(58) Field of Classification Search
USPC ......... 358/3.1, 1.9, 518, 1.1; 347/249; 726/20
See application file for complete search history.

(56) References Cited

U.S. PATENT DOCUMENTS

| 5,200,765 A | 4/1993 | Tai |
| 5,410,414 A | 4/1995 | Curry |
| 5,485,289 A | 1/1996 | Curry |
| 5,638,107 A | 6/1997 | Curry |
| 5,638,110 A | 6/1997 | Curry et al. |
| 5,732,162 A | 3/1998 | Curry |
| 5,963,244 A | 10/1999 | Mestha et al. |
| 6,243,100 B1 | 6/2001 | Curry et al. |
| 6,452,696 B1 | 9/2002 | Bogart et al. |
| 6,519,055 B1 | 2/2003 | Curry et al. |

(Continued)

FOREIGN PATENT DOCUMENTS

| EP | 651 558 | 5/1995 |
| EP | 651 559 | 5/1995 |

(Continued)

*Primary Examiner* — Twyler Haskins
*Assistant Examiner* — Michael Burleson
(74) *Attorney, Agent, or Firm* — Nancy R. Simon; Peyton C. Watkins (57) ABSTRACT

One or more printers or printing systems are connected to a scanning device. Each printer includes one or more color modules that are used during a printing operation. A printer prints a target for each color module or color channel. The printed targets are then scanned by the scanning device. The printed targets may be rotated to any angle and then scanned by the scanning device. The scanned raster data is processed by a controller to detect non-uniformities in at least one density image and to generate one or more correction profiles for the printer. When an image is to be printed, one or more controllers receive the image data and use the one or more correction profiles to correct or compensate for the non-uniformities during the exposure process.

9 Claims, 10 Drawing Sheets

U.S. PATENT DOCUMENTS

| | | |
|---|---|---|
| 6,554,388 B1 | 4/2003 | Wong et al. |
| 6,819,352 B2 | 11/2004 | Mizes et al. |
| 7,379,085 B2 * | 5/2008 | Baretsky et al. .............. 347/249 |
| 2002/0057470 A1 | 5/2002 | Koide et al. |
| 2002/0075379 A1 | 6/2002 | Klassen et al. |
| 2003/0206308 A1 * | 11/2003 | Matsuya .................. 358/1.9 |
| 2004/0179090 A1 | 9/2004 | Klassen et al. |
| 2004/0252905 A1 | 12/2004 | Mizes et al. |
| 2005/0036705 A1 | 2/2005 | Viassolo et al. |
| 2005/0099446 A1 | 5/2005 | Mizes |
| 2005/0134624 A1 | 6/2005 | Mizes |
| 2005/0265739 A1 | 12/2005 | Hamby et al. |
| 2006/0001911 A1 | 1/2006 | Viassolo et al. |
| 2006/0071185 A1 | 4/2006 | Mizes et al. |
| 2006/0071963 A1 | 4/2006 | Sampath et al. |
| 2006/0077488 A1 | 4/2006 | Zhang et al. |

FOREIGN PATENT DOCUMENTS

| | | |
|---|---|---|
| EP | 598 104 | 4/1999 |
| EP | 651 552 | 6/1999 |
| EP | 651 560 | 6/1999 |
| EP | 892 549 | 11/2001 |
| WO | 9326116 | 12/1993 |

* cited by examiner

ADAPTIVE EXPOSURE PRINTING AND PRINTING SYSTEM

CROSS REFERENCE TO RELATED APPLICATIONS

This application claims the benefit of U.S. Provisional Application No. 61/106,172 filed on Oct. 17, 2008, and U.S. Provisional Application No. 61/183,992 filed on Jun. 4, 2009, which are incorporated herein by reference.

TECHNICAL FIELD

The present invention relates generally to the filed of digitally controlled printing devices, and in particular to devices and methods that improve the image quality of prints produced by these printing devices.

BACKGROUND

Digital printing has begun to play an ever-increasing role in the commercial printing industry, and the demand for the capability of digital printing technologies, such as electrophotography, drop-on-demand inkjet, and continuous inkjet, to deliver high quality prints is also increasing. Various image artifacts in the spatial domain, the temporal domain, or the spatial and temporal domains adversely affect image quality. For instance, granularity is defined as the aperiodic non-uniform reflection density/color distribution in the microscopic spatial domain, and color consistency is affected by the stability of a printing press over a period of time. One artifact that plagues most of the digital printing systems is the one dimensional macro non-uniformity, which is usually denoted as streaking or banding, depending on its aperiodic or periodic characteristics. Streaking and banding can occur either parallel, perpendicular, or any other angle to the printing process direction.

A digital press is composed of many subsystems, and each subsystem can contribute to the streak/band artifact. For example, the electrophotography imaging process consists of six major steps: charge, expose, develop, transfer, fuse, and clean. The usual approach to eliminating the formation of a streak or band artifact on a digital press is to optimize each subsystem and hope the final assembled system will satisfy the product requirement. While the subsystem optimization is necessary to improve the overall system performance in image quality, it might result in a very stringent requirements or tolerances for each subsystem because of the effect of accumulating error in the final system. Furthermore, the subsystem optimization process does not address the problems arising from the interaction among subsystems.

SUMMARY

Briefly summarized, according to one aspect of the invention, one or more printers or printing systems are connected to a scanning device. Each printer includes one or more color modules that are used during a printing operation. A printer prints a target for each color module or color channel. The printed targets are then scanned by the scanning device. The printed targets may be rotated to any angle and then scanned by the scanning device. The scanned raster data is processed by a controller to detect non-uniformities in at least one density image and to generate one or more correction profiles for the printer. When an image is to be printed, one or more controllers receive the image data and use the one or more correction profiles to correct or compensate for the non-uniformities during the exposure process.

If a printing system is implemented as an electrostatographic reproduction system, the system includes a printer having at least one color module, the at least one color module including an exposure device, and the printer including a process direction. A controller is configured to print a target with the at least one color module of the printer, the target including a plurality of alignment features and at least one uniform density image extending in a direction transverse to the process direction of the printer. A scanning device scans the printed target at a resolution and a gray scale commensurate with the exposure device of the at least one color module to obtain raster data representing the at least one density image and the alignment features of the target. A controller is configured to process the raster data to detect the alignment features and realign the raster data to correspond with pixel locations of the exposure device. The same controller or a different controller is configured to process the realigned raster data to detect non-uniformities in the at least one density image of the target occurring in a direction transverse to the process direction of the printer. The same controller or a different controller is configured to determine a correction profile that correlates the location and magnitude of the non-uniformities to individual pixel locations and exposure levels of the exposure device of the at least one color module. The same controller or a different controller is configured to use the correction profile to compensate for the non-uniformities detected in the target by modifying the individual exposure levels of the exposure device when the at least one color module of the printer is used to print.

In one embodiment in accordance with the invention, a method of printing includes printing a target for each color module of the printer. The printed target or targets are scanned by a scanning device to produce scanned raster data. The scanned raster data is processed to detect non-uniformities in the target and determine a correction profile. When an image is to be printed, the correction profile is used to compensate for the non-uniformities detected in the target by printing the image with one or more color modules of the printer using the correction profile.

In another embodiment in accordance with the invention, a method of printing includes printing a target for the at least one color module of the printer, the target including a plurality of alignment features and at least one uniform density image extending in a direction transverse to the process direction of the printer. The printed target is then scanned at a resolution and a gray scale commensurate with the exposure device of the at least one color module to obtain raster data representing the at least one density image and the alignment features of the target. The raster data is processed to detect the alignment features and realign the raster data to correspond with pixel locations of the exposure device. The realigned raster data is processed to detect non-uniformities in the at least one density image of the target occurring in a direction transverse to the process direction of the printer. A correction profile is then determined that correlates the location and magnitude of the non-uniformities to individual pixel locations and exposure levels of the exposure device of the at least one color module

BRIEF DESCRIPTION OF THE DRAWINGS

The above and other objects, features and advantages of the invention will become more apparent by reference to the following detailed description of the invention taken in con

DETAILED DESCRIPTION

Throughout the specification and claims the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected or an indirect connection through one or more passive or active intermediary devices. The term "circuit" means either a single component or a multiplicity of components, either active or passive, that are connected together to provide a desired function. The term "signal" means at least one current, voltage, or data signal.

Additionally, directional terms such as "on", "over", "top", "bottom", are used with reference to the orientation of the Figure(s) being described. Because components of embodiments of the present invention can be positioned in a number of different orientations, the directional terminology is used for purposes of illustration only and is in no way limiting.

Referring to the drawings, like numbers indicate like parts throughout the views.

Figure 1:
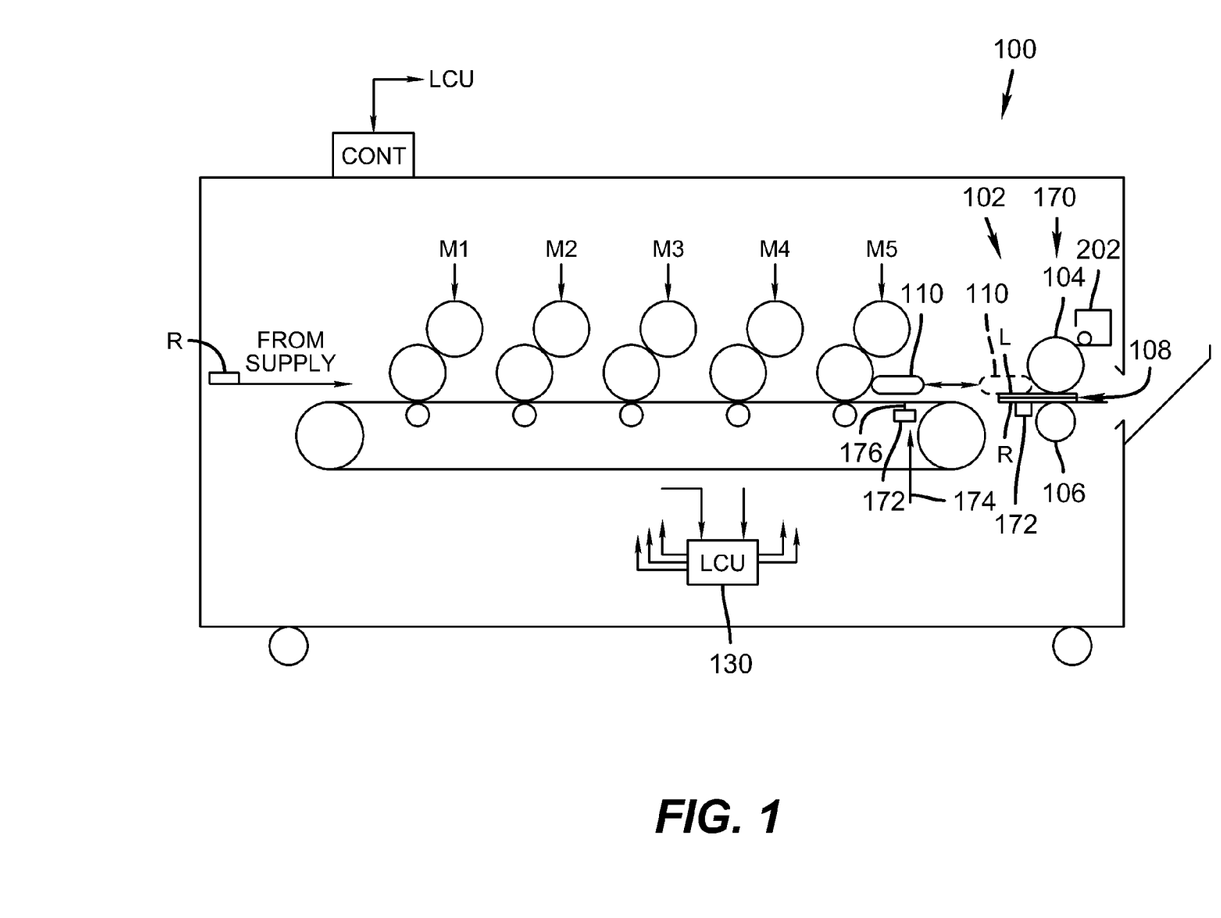
- FIG. 1 is a schematic side elevational view, in cross section, of an exemplary electrographic printer suitable for use in an embodiment in accordance with the invention.
Figure 2:
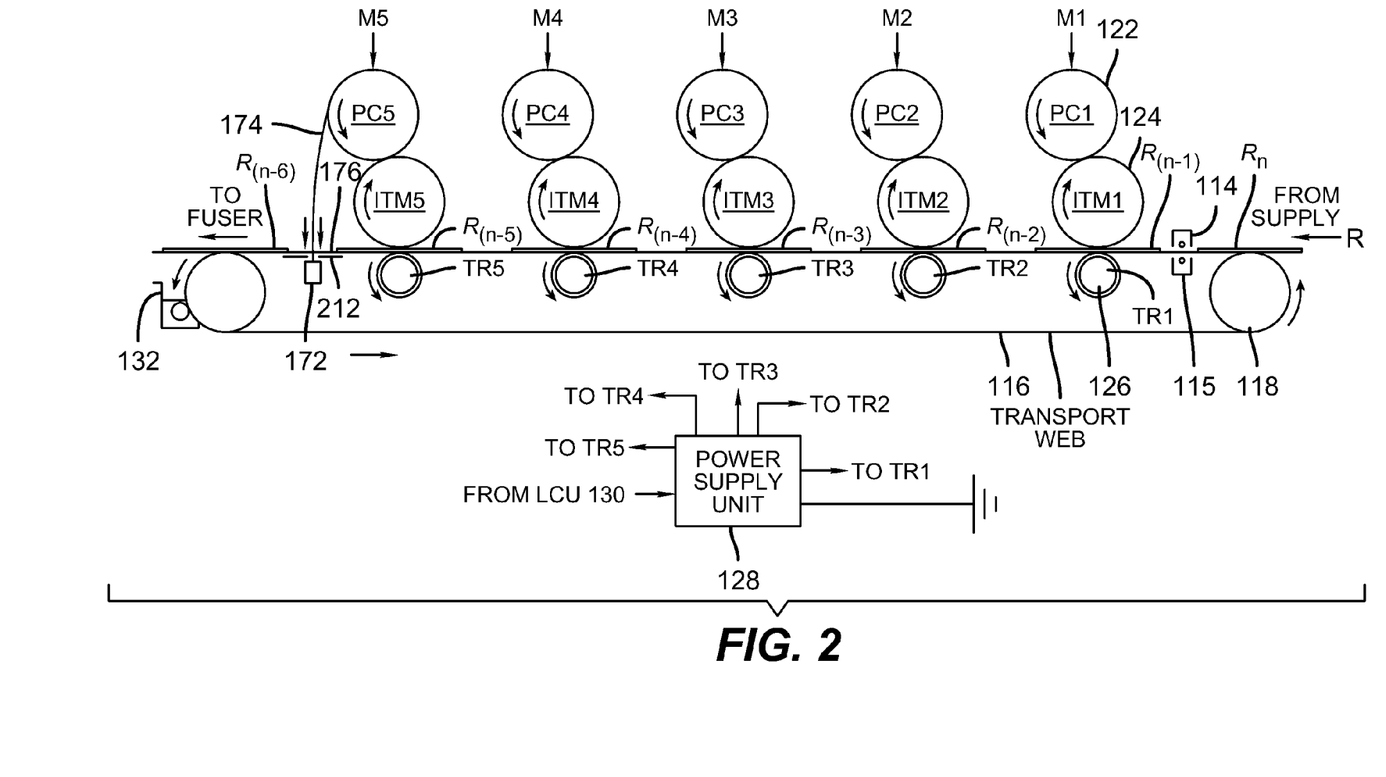
FIG. 2 is a schematic side elevation view, in cross section, of the reprographic image-producing portion of the electrographic printer shown in FIG. 1, on an enlarged scale.

FIGS. 1 and 2 are side elevational views schematically showing portions of a typical electrographic printer suitable for use in an embodiment in accordance with the invention. As depicted in FIGS. 1 and 2, apparatus 100 is configured as an electrographic printer that produces multi-channel layered prints. One embodiment of the invention involves printing using an electrophotographic engine having five sets of single color image producing or printing stations or modules arranged in tandem and an optional finishing assembly. The invention contemplates that more or less than five stations may be combined to deposit toner on a single receiver member, or may include other typical electrographic writers, printer apparatus, or other finishing devices.

Electrographic printer 100 has a number of tandemly arranged electrostatographic image forming printing modules M1, M2, M3, M4, and M5 and a finishing assembly 102. Additional modules may be provided. Each of the printing modules generates a single-color toner image for transfer to a receiver member successively moved through the modules. The finishing assembly has a fuser roller 104 and an opposing pressure roller 106 that form a fusing nip 108 there between. The finishing assembly 118 can also include a laminate application device 110. A receiver member R, during a single pass through the five modules, can have transferred, in registration, up to five single-color toner images to form a pentachrome image. As used herein, the term pentachrome implies that in an image formed on a receiver member combinations of subsets of the five colors are combined to form other colors on the receiver member at various locations on the receiver member, and that all five colors participate to form process colors in at least some of the subsets wherein each of the five colors may be combined with one or more of the other colors at a particular location on the receiver member to form a color different than the specific color toners combined at that location.

In one embodiment in accordance with the invention, printing module M1 forms black (K) toner color separation images, M2 forms yellow (Y) toner color separation images, M3 forms magenta (M) toner color separation images, and M4 forms cyan (C) toner color separation images. Printing module M5 may form a red, blue, green or any other fifth color separation image. It is well known that the four primary colors cyan, magenta, yellow, and black may be combined in various combinations of subsets thereof to form a representative spectrum of colors and having a respective gamut or range dependent upon the materials used and process used for forming the colors. However, in the electrographic printer 100, a fifth color can be added to improve the color gamut. In addition to adding to the color gamut, the fifth color may also be used as a specialty color toner image, such as for making proprietary logos, a clear toner or a separate layer, such as a laminate L or film, for image protective purposes and/or a foil or filter for decorative or imaging purposes.

Receiver members ($R_n$–$R_{(n-6)}$), where n is the number of modules as shown in FIG. 2, are delivered from a paper supply unit (not shown) and transported through the printing modules M1-M5 in a direction indicated in FIG. 2 as R. The receiver members are adhered (e.g., preferably electrostatically via coupled corona tack-down chargers 114, 115) to an endless transport web 116 entrained and driven about rollers 118, an intermediate transfer member roller, and a transfer backup roller. Thus in printing module M1, a black color toner separation image can be created on the photoconductive imaging roller PC1 (122), transferred to intermediate transfer member roller ITM1 (124), and transferred again to a receiver member moving through a transfer station, which includes ITM1 forming a pressure nip with a transfer backup roller TR1 (126). Similarly, printing modules M2, M3, M4, and M5 include, respectively: PC2, ITM2, TR2; PC3, ITM3, TR3; PC4, ITM4, TR4; and PC5, ITM5, TR5. A receiver member, $R_n$, arriving from the supply, is shown passing over roller 118 for subsequent entry into the transfer station of the first printing module, M1, in which the preceding receiver member $R_{(n-1)}$ is shown. Similarly, receiver members $R_{(n-2)}$, $R_{(n-3)}$, $R_{(n-4)}$, and $R_{(n-5)}$ are shown moving respectively through the transfer stations of printing modules M2, M3, M4, and M5. An unfused image formed on receiver member $R_{(n-6)}$ is moving, as shown, towards one or more finishing assemblies 102 (FIG. 1) that include a fuser, such as those of well known construction, and/or other finishing assemblies in parallel or in series that includes, preferably a lamination device 110 (FIG. 1). Alternatively, the lamination device 110 can be included in conjunction to one of the print modules, Mn, which in one embodiment is the fifth module M5.

A power supply unit 128 provides individual transfer currents to the transfer backup rollers TR1, TR2, TR3, TR4, and TR5 respectively. A logic and control unit 130 (FIG. 1; hereinafter "controller") in response to signals from various sensors associated with the electrophotographic printer 100 provides timing and control signals to the respective components to provide control of the various components and process control parameters of the apparatus in accordance with well understood and known employments. A cleaning station 132 for transport web 116 is also typically provided to allow continued reuse thereof.

Figure 3:
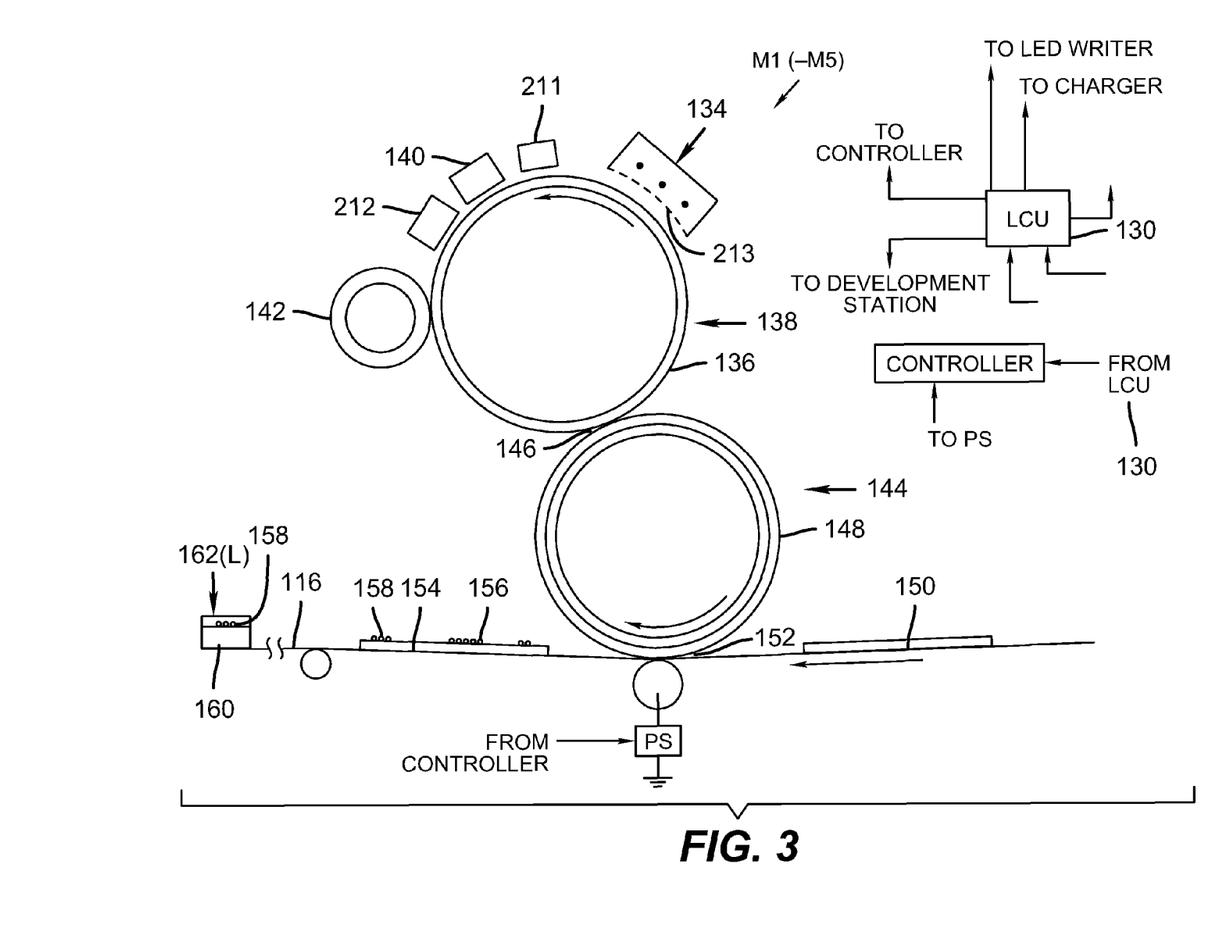
FIG. 3 is a schematic side elevational view, in cross section, of one printing module of the electrographic printer shown in FIG. 1, on an enlarged scale.

Referring now to FIG. 3, there is shown a representative printing module (e.g., M1 of M1-M5). Each printing module of the electrographic printer 100 (FIG. 1) includes a plurality of electrographic imaging subsystems for producing one or more multilayered image or pattern. Included in each printing module is a primary charging subsystem 134 for uniformly electrostatically charging a surface 136 of a photoconductive imaging member (shown in the form of an imaging cylinder 138). An exposure subsystem 140 is provided for image-wise modulating the uniform electrostatic charge by exposing the photoconductive imaging member to form a latent electrostatic multi-layer (separation) image of the respective layers. A development station subsystem 142 develops the image-wise exposed photoconductive imaging member. An intermediate transfer member 144 is provided for transferring the respective layer (separation) image from the photoconductive imaging member through a transfer nip 146 to the surface 148 of the intermediate transfer member 144 and from the intermediate transfer member 144 to a receiver member (receiver member 150 shown prior to entry into the transfer nip 152 and receiver member 154 shown subsequent to transfer of the multilayer (separation) image) which receives the respective (separation) images 156 in superposition to form a composite image 158 thereon. Receiver member 160 shown subsequent to the transfer of an additional layer 162 that can be, in one embodiment, a laminate L.

Controller 130 shown in FIG. 3 includes a microprocessor incorporating suitable look-up tables and control software, which is executable by the LCU 130. The control software is preferably stored in memory associated with the LCU 130. Sensors associated with the fusing assembly provide appropriate signals to the LCU 130. In response to the sensors, the controller 130 issues command and control signals that adjust the heat and/or pressure within fusing nip 108 (FIG. 1) and otherwise generally nominalizes and/or optimizes the operating parameters of finishing assembly 102 (see FIG. 1) for printing multi-channeled layers in an image 158 on a substrate for as print.

Subsequent to transfer of the respective (separation) multilayered images, overlaid in registration, one from each of the respective printing modules M1-M5, the receiver member is advanced to a finishing assembly 102 (shown in FIG. 1) including one or more fusers 170 to optionally fuse the multilayer toner image to the receiver member resulting in a receiver product, also referred to as a final multi-channeled layer print. The finishing assembly 102 may include a sensor 172, an energy source 174 and one or more laminators 110. This can be used in conjunction to a registration reference 176 as well as other references that are used during deposition of each layer of toner, which is laid down relative to one or more registration references, such as a registration pattern.

Figure 4:
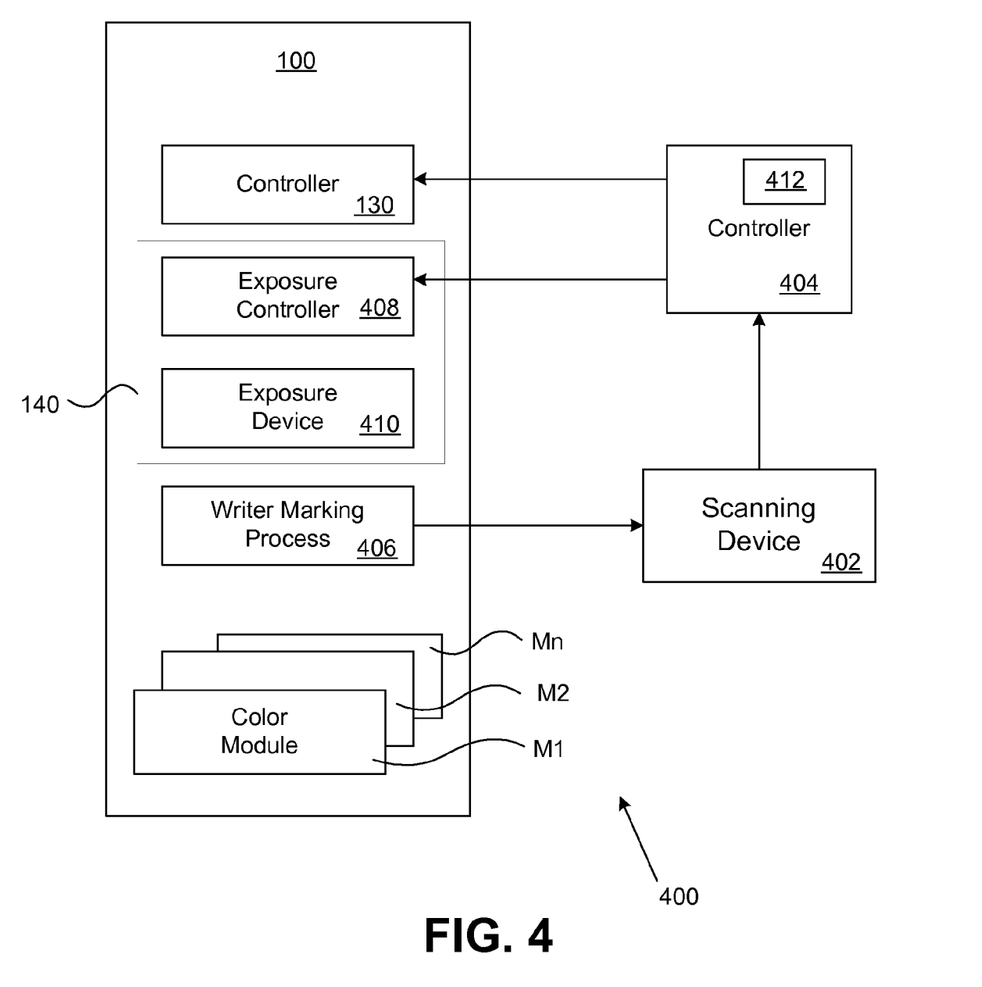
FIG. 4 is a simplified block diagram of a first system in an embodiment in accordance with the invention.

FIG. 4 is a simplified block diagram of a first system in an embodiment in accordance with the invention. System 400 includes electrophotographic printer 100, scanning device 402, and controller 404. Printer 100 includes controller 130, exposure subsystem 140, writer marking process 406, and one or more color modules M1, M2, . . . Mn. Exposure device controller 408 in exposure subsystem 140 provides timing and control signals to exposure device 410. Scanning device 402 is used to perform an off-line scanning operation in the embodiment shown in FIG. 4.

As will be described in more detail with reference to FIGS. 7-10, system 400 corrects or compensates for one or more non-uniformities in a printed image. Printer 100 prints a target for each color channel. The printed targets are then scanned by scanning device 400. The scanned raster data is used by controller 404 to generate one or more correction profiles for apparatus 100. The one or more correction profiles are stored in memory 412. Memory 412 is located in system 400 in another embodiment in accordance with the invention.

When printer 100 is to print an image, controller 130 receives the image data and exposure device controller 408 uses the one or more correction profiles to correct or compensate for the non-uniformities during the exposure process by exposure device. Writer marking process 406, in conjunction with color modules M1 . . . Mn, then produce the printed image.

Although depicted as separate controllers in FIG. 4, other embodiments in accordance with the invention can combine controller 130 and exposure device controller 408 in a single controller. Additionally, controller 404 can be implemented as any one of a variety of controllers, including, but not limited to, a processor, a computing device, a computer, and a server. And finally, scanning device 402 can be used to perform an in-line scanning operation and be constructed within system 400 in another embodiment in accordance with the invention.

Figure 5:
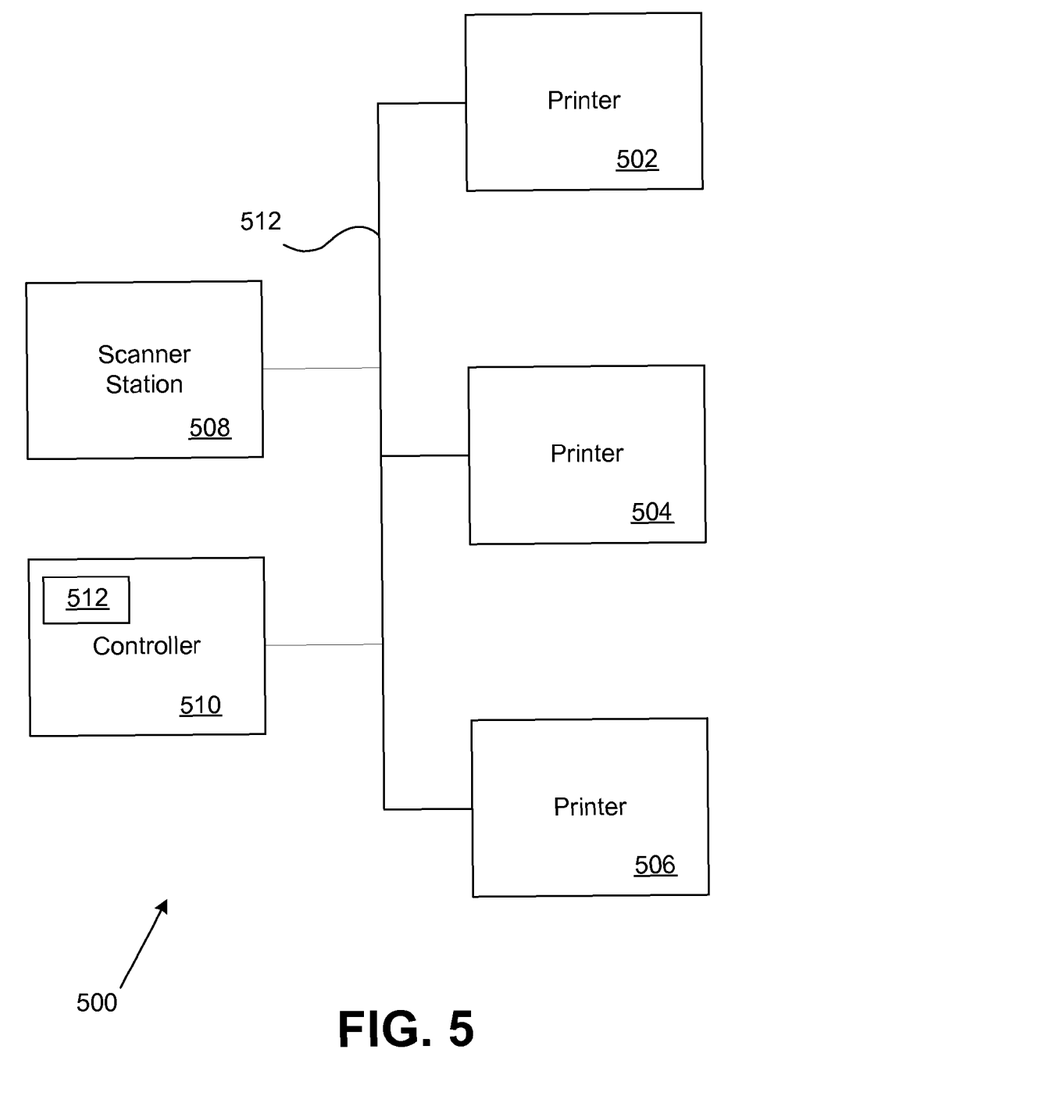
FIG. 5 is a simplified block diagram of a second system in an embodiment in accordance with the invention.

Referring now to FIG. 5, there is shown a simplified block diagram of a second system in an embodiment in accordance with the invention. System 500 includes multiple printing systems 502, 504, 506 connected to scanning device station 508 and controller 510 through one or more network connections 512. Printing systems 502, 504, 506 are implemented as printers, such as, for example, electrophotographic printers.

In this exemplary embodiment, each printing system 502, 504, 506 prints a target for each color channel that are scanned by scanner station 508. The scanned raster data is used by controller 510 to generate one or more correction profiles for the respective printing system. When a printing system is to print an image, controller 510 receives the image data and uses the one or more correction profiles stored in memory 514 to correct or compensate for the non-uniformities.

Although depicted as a central controller in FIG. 5, other embodiments in accordance with the invention can employ individual controllers for each reproduction system. Additionally, controller 510 can be implemented as any one of a variety of controllers, including, but not limited to, a processor, a computing device, a computer, and a server. And finally, memory 514 can be eliminated and a memory located in each printer to store one or more correaction profiles in other embodiments in accordance with the invention.

Figure 6:
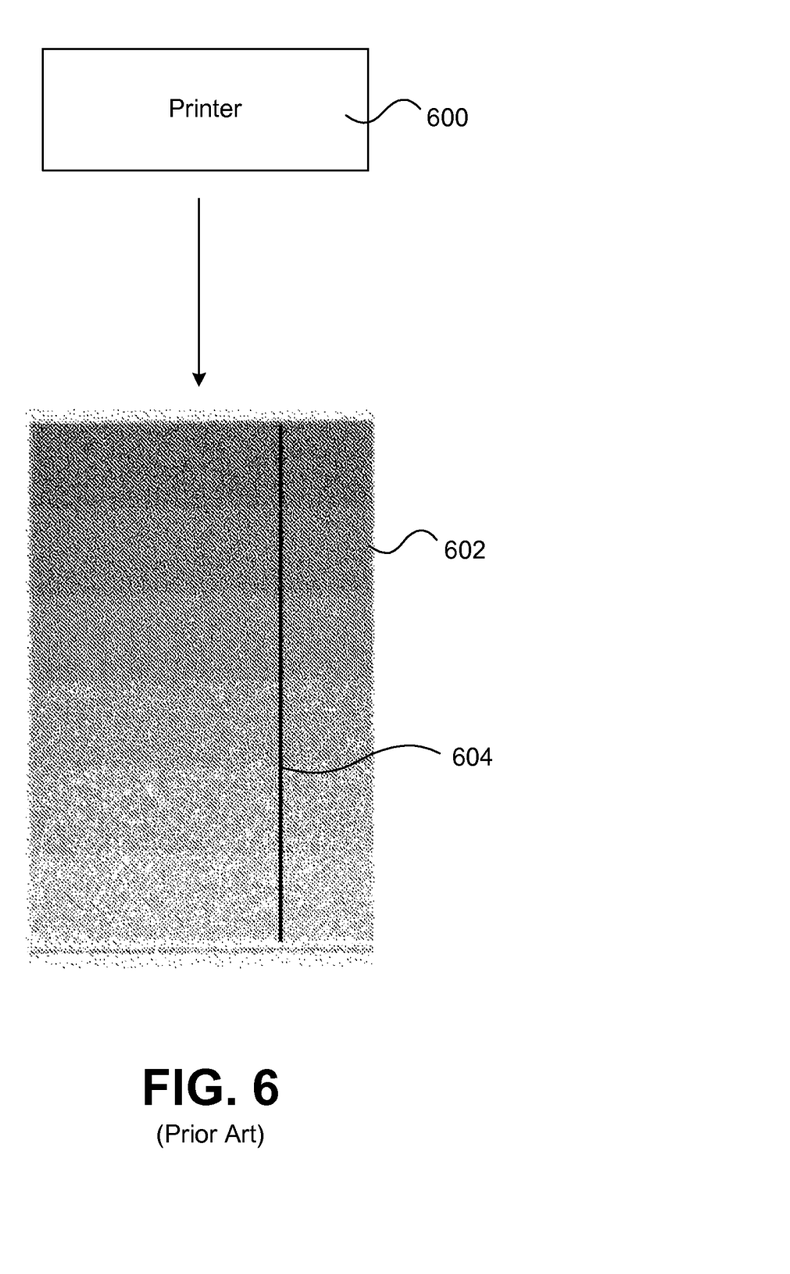
FIG. 6 is a simplified illustration of a printed target that includes a non-uniformity in accordance with the prior art.

FIG. 6 is a simplified illustration of a printed target that includes a non-uniformity in accordance with the prior art. Printer 600 produces printed image 602, which includes non-uniformity 604. In FIG. 6, the non-uniformity is depicted as a streak that is output parallel to the direction of printing. Streaks can also be produced perpendicular to, or in any other angle, relative to the direction of printing. Additionally, different types of non-uniformities can be generated in other prior art embodiments. For example, a non-uniformity includes, but is not limited to, left-to-right density non-uniformity, gloss non-uniformity, color-to-color overprint non-uniformity, and mottle-like non-uniformity.

Figure 7:
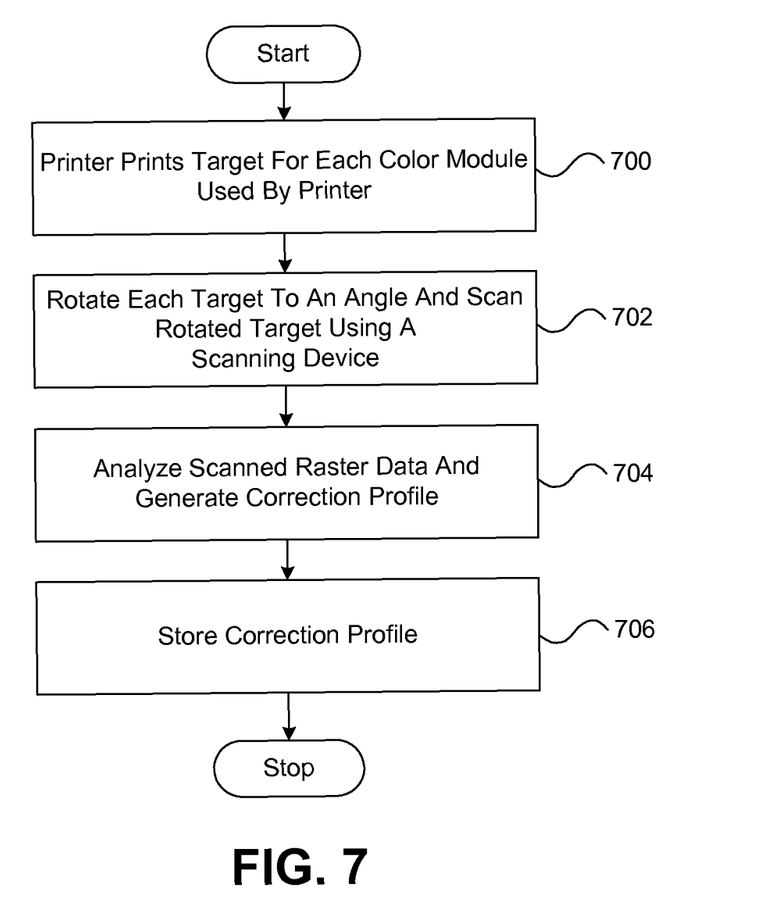
FIG. 7 is a flowchart of a method for generating a correction profile for a printing system in an embodiment in accordance with the invention.

FIG. 7 is a flowchart of a method for generating a correction profile for a printing system in an embodiment in accordance with the invention. The method of FIG. 7 can be used to generate one or multiple correction profiles for a printer. The correction profile is used to reduce or eliminate one or more non-uniformities in a printed image. Initially, a target is printed for each color module that is used by the printer (block 700). Thus, four targets are printed for CMYK printers; one target for cyan, one for magenta, one for yellow, and one for black. The target includes one or more uniform density images that extend in transverse to the process direction of the printer and includes one or more different types of alignment marks in an embodiment in accordance with the invention.

Each target is rotated to an angle and then scanned by a scanning device, as shown in block 702. The angle can be any given angle. For example, in one embodiment in accordance with the invention, the angle is ninety (90) degrees.

The raster data produced by the scanning device for each target is then analyzed and a correction profile created for the printer (block 704). Block 704 will be described in more detail in conjunction with FIG. 8. The correction profile is then stored, as shown in block 706. The correction profile can be stored, for example, in the printer itself, in a print server connected to the printer via a network connection, or in a memory connected to the printer.

Figure 8:
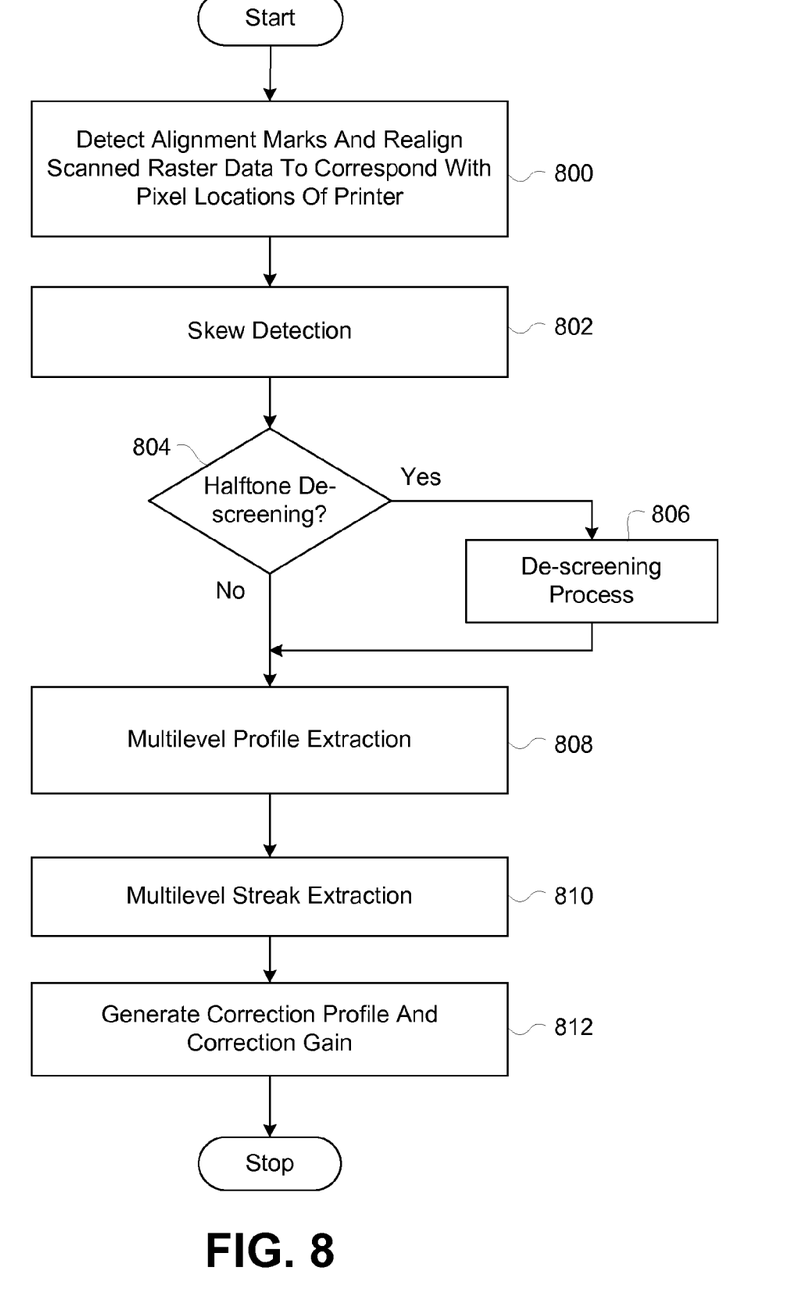
FIG. 8 is a flowchart of a method for block 704 shown in FIG. 7 in an embodiment in accordance with the invention.

Referring now to FIG. 8, there is shown a flowchart of a method for block 704 shown in FIG. 7 in an embodiment in accordance with the invention. Initially, as shown in block 800, the one or more different types of alignment marks on each printed target are detected and used to realign the raster data from the scanning device to correspond to the pixel locations of the printer. The skew angle is also determined or estimated to determine the optimal density code values for a correction profile (block 802).

Next, at block 804, an optional determination is made as to whether or not a de-screening process is to be performed on the raster data. If so, the process passes to block 806 for a de-screening process. The de-screening process can be implemented as any known conventional de-screening process. By way of example only, the raster image can be input into a Gaussian filter for de-screening.

The method continues at block 808 where a multilevel profile is extracted from the raster data. The raster data is processed by a motion filter based on the estimated skew angle determined at block 802. A multilevel streak extraction is then performed on the raster data at block 810, where a spline function having a non-uniform knot placement is used to model the overall density fluctuations at each density level. Streak signals are the difference between the profiles and the fitted spline curves in an embodiment in accordance with the invention. Streak signals can be represented in the code-value space and its logarithmic space.

The correction profile and gain are then generated, as shown in block 812. The streak signals are correlated using a singular value decomposition The first component is extracted as the correction profile and the remaining signal used to refine the correction profile to better address fine and sharp edges in an embodiment in accordance with the invention.

The correction gain is generated by linearly fitting the streak signal on the extracted correction profile in the logarithmic space. The slope is used as the correction gain coefficient.

The following description details one technique for deterministically correcting for a one-dimensional non-uniformity by modifying its digital writing module. There are two classes of creating grayscale and color images on reflective substrates: continuous-tone and halftone. The color mixing theory that explains how light interacts with the substrate and colorant is slightly different between the two. For example, the Yule-Nielsen model is designed for a halftone printing process while the Beer-Bouguer law assumes a homogeneous medium, and the light absorbed by the medium is proportional to its intensity. If Ds is the reflection density of a solid patch, the Yule-Nielsen model relates the halftone dot area, $A_h$, and the measured reflection density, D, on a halftoned patch as follows:

$$A_h = \frac{1 - 10^{-\frac{D}{n}}}{1 - 10^{-\frac{Ds}{n}}} \tag{1}$$

where n is determined by the actual printing process. The Beer-Bouguer law suggests that D is a linear function of colorant concentration, c, absorption coefficient, $K(\lambda)$, and total length of light path, w, inside the colorant:

$$D = \frac{1}{2.3026} K(\lambda) w c \tag{2}$$

As a result, it can be deduced that non-uniformity in reflection density, $\Delta D$, on a halftone print sample is caused by the variation in the dot area, $\Delta A$. The non-uniformity in reflection density, $\Delta D$, on a continuous-tone print sample is caused by the differential length in light path, $\Delta w$, assuming colorant concentration, c, is uniform. Because it is always possible to calibrate the dot area $A_h \to \tilde{A}_h$ this analysis can be focused to the limiting case of $n \to \infty$ such that the Yule-Nielsen model as noted in Equation (1) is simplified as follows:

$$\tilde{A}_h = \frac{D}{D_s} \tag{3}$$

As a result, $\Delta D$ is linearly correlated with $\Delta \tilde{A}_h$ in the halftone printing process, and with $\Delta w$ on the continuous-tone printing process. Thus, without loss of generality, the analysis is focused on the halftone imaging process.

Let r be the radius of each halftone dot, and $\tilde{A}_h = \Pi r^2$. One unknown disturbance, $\Theta_i$, in the printing system drives the printing system from its intended location in a color space, for instance reflection density $D_i$, at location $x_i$. We can deduce that $\Theta_i$ results in small variation $\delta r_i$ in the radius, $r_i$, of the halftone dot at $x_i$. That is:

$$r_i \to r_i + \delta r_i \tag{4}$$

where $\pm r_i$ is a function of $r_i$. Based on the Taylor expansion, we can reformulate $\pm r_i$ as follows:

$$\delta r_i(r_i) = \sum_{k=0}^{\infty} \alpha_{ik} r_i^k \tag{5}$$

and $\{\alpha_{ik}\}_{k=0}^{\infty}$ is determined by $\Theta i$. Since $\delta r_i$ is usually very small, the following equations based on Equation (3) can be derived as follows:

$$\Delta D_i = D_s \Delta \tilde{A}_h = D_s 2\pi r_i \delta r_i = \sum_{k=0}^{\infty} (2\pi D_s \alpha_{ik}) r_i^{k=1} \tag{6}$$

In one embodiment, ±r is assumed to be proportional to the current radius r as noted below:

$$\delta r_i = \alpha_{i1} r_i \quad (7)$$

Under this assumption, Equation (6) can be simplified to:

$$\Delta D_i = 2\pi D_s \alpha_{i1} r_i^2 = 2D_s \alpha_{i1} \tilde{A}_h \quad (8)$$

Equation (8) suggests that the magnitude of the streak signal $\Delta D_i$ at location $x_i$ is linearly increasing with respect to the linearized colorant area coverage $\tilde{A}_{hi}$. Let $\overline{\phi}_j$ and $\vec{\alpha}$ be the estimated reflection density variation and the corresponding streak coefficient perpendicular to the direction of the streak and/or band across the full range at averaged colorant coverage $A_{hj}$, where $j=1, \ldots, J$. Estimating a from single realization of $\vec{\phi}_j$ is very noisy and unreliable, which will results in inferior compensation parameter for the digital writing module. This problem can be greatly alleviated by correlating estimated reflection variation at multiple density levels as follows:

$$\Phi = [\phi_1 \phi_2 \ldots \phi_J] = 2D_s[A_{h1} A_{h2} \ldots A_{hJ}]\vec{\alpha} \quad (9)$$

Equation (9) indicates that the dimensionality of $\Phi$ is 1, and the remaining J-1 dimension is the null space composed by measurement/printing noise. As a result, $\vec{\alpha} = |\alpha| \vec{\eta}$ where $\vec{\eta}$ is the first left singular vector of $\Phi$. At last, by projecting $\Phi$ and $\vec{\alpha}$ onto $\vec{\eta}$, Equation (9) can be simplified as follows:

$$|\phi| = 2D_s |\alpha| A_h = m_h A_h \quad (10)$$

Thus, $|\alpha|$ is proportional to the estimated slope, $m_h$, in Equation (10). This analysis can be further extended when $\vec{\alpha}$ is a function of r. Assuming the thickness of the colorant layer is fixed before multiple layers of colorant are formed on the substrate, it can be deduced that $\tilde{A}_{hi}$ is proportional to M/A, which represents the colorant mass per unit area. M/A can be controlled by the digital writing module. For example, the theoretical analysis on the electrophotography using conductive magnetic brush development can be approximated in first order by the following equation (1):

$$A_h \propto \frac{M}{A} = \frac{C_t v V p}{Q/M} \frac{\rho_c}{\rho_t} \frac{8\varepsilon_0}{r_i} = \alpha_D V = \alpha_D \Gamma(\varpi) \quad (11)$$

where $C_t$ is the toner concentration, $v$ is the speed ratio factor between roller and photoreceptor, V is the applied voltage, p represents carrier surface packing, Q/M is the charge to mass ratio, $\rho_c$ and $\rho_t$ are the densities of carrier and toner respectively, $\varepsilon_o$ is the permittivity of free space, and $r_t$ stands for the toner radius. $\Gamma(\overline{\omega})$ is the mapping function from the power of the digital writing module, $\overline{\omega}$, to the applied voltage, V, on the photoreceptor. As a result, the following relationship can be derived:

$$\frac{\Delta A_h}{A_h} = \frac{2\delta r}{r} = 2\alpha \propto \frac{\delta V}{V} = \frac{\delta \Gamma(\varpi)}{\Gamma(\varpi)} \quad (12)$$

Equation (12) summarizes the theoretical basis to deterministically correcting a one-dimensional non-uniformity by modifying its digital writing module.

Figure 9:
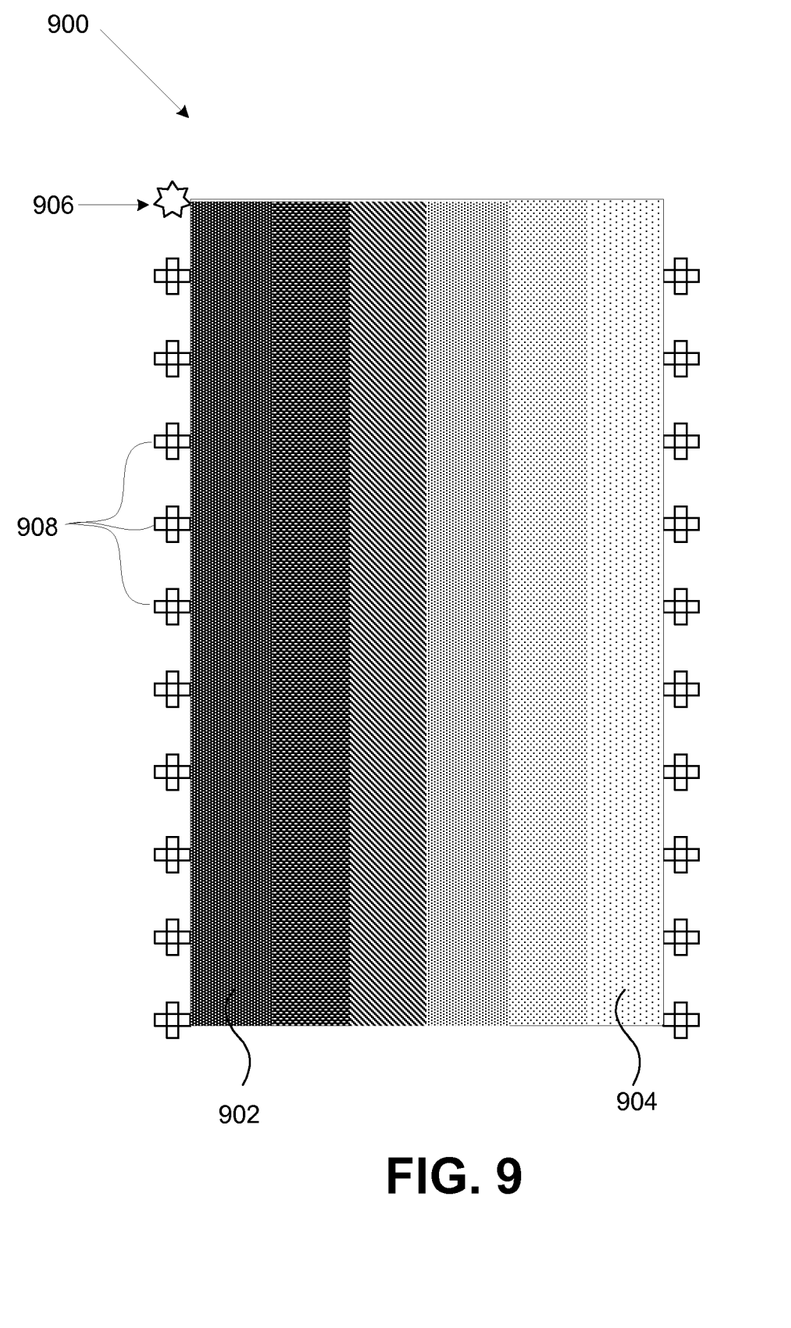
FIG. 9 is a graphical illustration of a target having enlarged alignment marks in an embodiment in accordance with the invention.

FIG. 9 is a graphical illustration of a target having enlarged alignment marks in an embodiment in accordance with the invention. As shown, target 900 includes multiple uniform density images and two different types of alignment marks. The uniform density images vary in tone from a darker tone uniform density image 902 to a lighter tone uniform density image 904. Alignment marks 906, 908 (shown enlarged for easier visibility) are used to correlate the location of the printed mark to a pixel location from the exposure device 410 (see FIG. 4). In the case where the exposure device is an LED printhead, the alignment marks can be used to locate the exact LED array locations on the printhead. The correction can be tuned for any one of the given tone densities. For example, in one embodiment in accordance with the invention, the correction is tuned for a mid-tone density.

Figure 10:
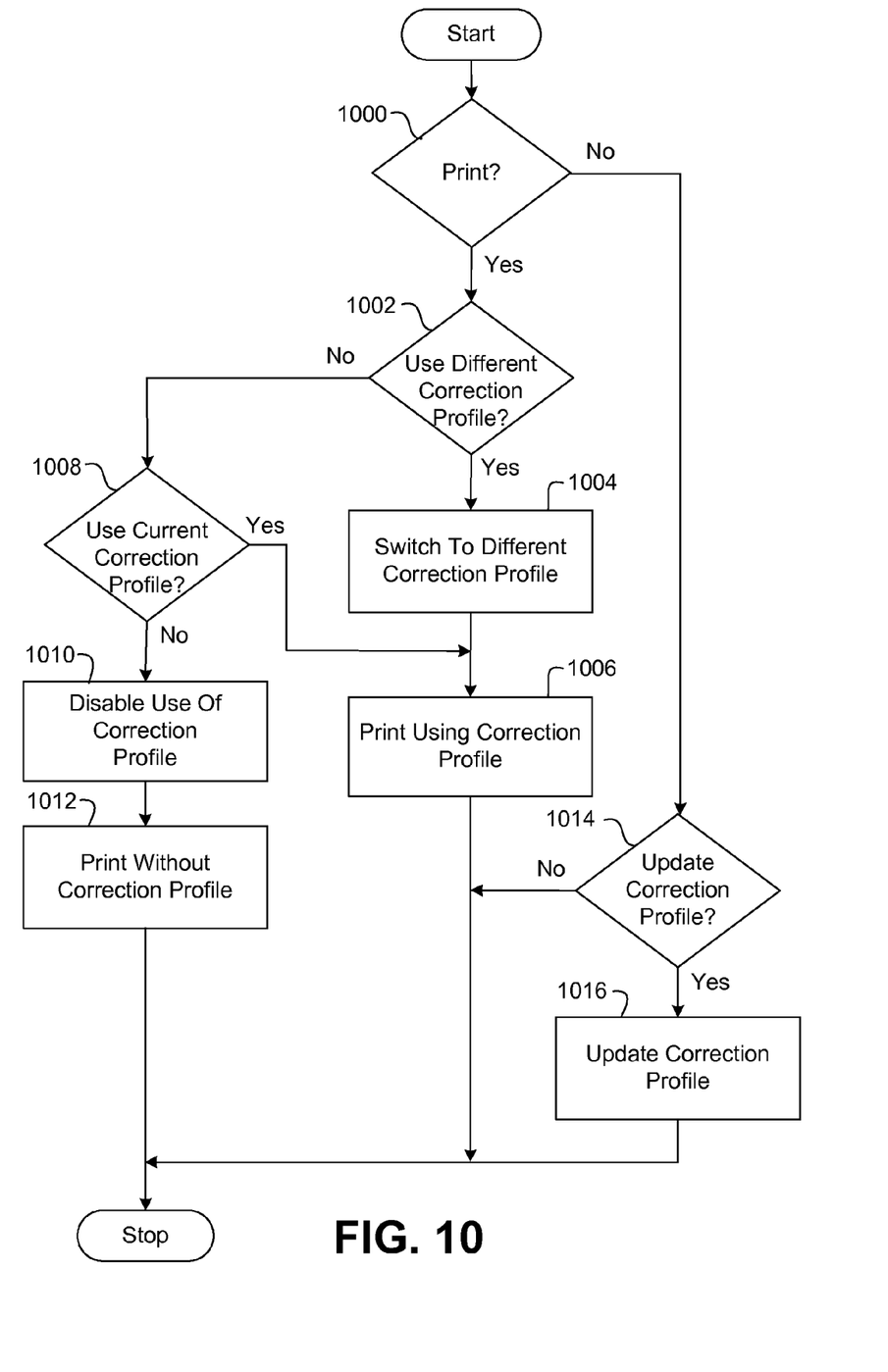
FIG. 10 is a flowchart of a method for printing an image in an embodiment in accordance with the invention.

Referring now to FIG. 10, there is shown a flowchart of a method for printing an image in an embodiment in accordance with the invention. A determination is made at block 1000 as to whether or not an image is to be printed. If so, the process continues at block 1002 where a determination is made as to whether or not a different correction profile from a current or default correction profile is to be used when printing the image. If so, the different correction profile is selected and the image printed using that correction profile (blocks 1004 and 1006). An exposure controller (e.g., controller 408 in FIG. 4) uses the correction profile to modulate the exposure device (e.g., 410 in FIG. 4) to vary the densities in the printed image.

If a different correction profile is not to be used, the method passes to block 1008 where a determination is made as to whether or not the current or default correction profile is to be used when printing the image. If so, the image printed using the current or default correction profile (block 1006). If the current or default correction profile is not to be used, use of the correction profile is disabled and the image printed without the correction profile (blocks 1010 and 1012).

Returning to block 1000, if an image is not to be printed, the process passes to block 1014 where a determination is made as to whether or not a correction profile is to be updated. If so, the profile is updated at block 1016 and the method ends.

The invention has been described with reference to particular embodiments in accordance with the invention. However, it will be appreciated that variations and modifications can be effected by a person of ordinary skill in the art without departing from the scope of the invention. Additionally, even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

The invention claimed is:

1. A method of printing using a printer that includes at least one color module to be used in a printing operation, each color module including an exposure device having a plurality of pixel locations extending transverse to a process direction of the printer, the method comprising:
   printing a single target for the at least one color module of the printer, with the single target including a plurality of uniform density images that are printed in part at different pixel locations of the plurality of pixel locations, each uniform density image having a respective, different requested density values;
   scanning the single printed target to produce scanned raster data representing reflection densities for the plurality of uniform density images;
   producing, for each uniform density image, a respective streak signal, each derived from a difference from a fitted spline curve and processed raster data at different pixel locations of the plurality of pixel locations;

determining for individual pixel locations of the plurality of pixel locations, a correlation among the streak signals for respective, different uniform density images;

generating a correction profile for individual pixel locations of the plurality of pixel locations based on the determined correlation;

projecting at least one of the streak signals onto the correction profile;

correlating the requested density values and the results of the projecting step to produce respective correction profile magnitudes for individual pixel locations in the plurality of pixel locations; and printing with at least one color module of the printer using the respective correction profile magnitudes for the individual pixel locations in the plurality of pixel locations to compensate for the non-uniformities detected in the target.

2. The method of claim 1, wherein scanning the printed target comprises:

rotating the printed target to a predetermined angle; and scanning the rotated printed target to produce scanned raster data.

3. The method of claim 1, wherein printing with the at least one color module includes printing with a color module that includes an exposure device with gray scale capability, wherein gray scale capability comprises at least one of pulse-width modulation of the exposure device and current modulation of the exposure device.

4. A method of electrostatographic reproduction with a printer including at least one color module to be used in a printing operation, the at least one color module including an exposure device having a plurality of pixel locations extending transverse to a process direction of the printer, the method comprising:

printing a single target for the at least one color module of the printer, the single target including a plurality of alignment features and a plurality of uniform density images extending in a direction transverse to the process direction of the printer, each uniform density image having a respective, different requested density values;

scanning the single printed target at a resolution and a gray scale commensurate with the exposure device of the at least one color module to obtain raster data representing reflection densities for the density images and the alignment features of the target;

processing the raster data to detect the alignment features and realign the raster data to correspond with pixel locations of the exposure device;

producing, for each uniform density image, a respective streak signal, each derived from a difference from a fitted spline curve and the processed raster data at different pixel locations of the plurality of pixel locations;

determining for individual pixel locations of the plurality of pixel locations, a correlation among the streak signals for respective, different uniform density images;

generating a correction profile for individual pixel locations of the plurality of pixel locations based on the determined correlation;

projecting at least one of the streak signals onto the correction profile;

correlating the requested density values and the results of the projecting step to produce respective correction profile magnitudes for individual pixel locations in the plurality of pixel locations, so that a correction profile is determined that correlates the location and magnitude of the non-uniformities to individual pixel locations and exposure levels of the exposure device of the at least one color module.

5. The method of claim 4, further comprising printing with the at least one color module of the printer using the respective correction profile magnitudes for individual pixel locations in the plurality of pixel locations to compensate for the non-uniformities detected in the target by modifying the individual exposure levels of the exposure device.

6. The method of claim 4, wherein scanning the single printed target at a resolution and a gray scale commensurate with the exposure device of the at least one color module to obtain raster data representing the at least one density image and the alignment features of the target comprises:

rotating the printed single target to a predetermined angle; and scanning the rotated printed single target at a resolution and a gray scale commensurate with the exposure device of the at least one color module to obtain raster data representing the at least one density image and the alignment features of the single target.

7. The method of claim 4, wherein the non-uniformities include streaks on the target.

8. The method of claim 4, wherein printing with the at least one color module includes modifying the individual exposure levels of an exposure device that includes an LED printhead with gray scale capability.

9. The method of claim 4, wherein scanning the printed single target is performed during one of an offline scanning operation and an in-line scanning operation.

* * * * *